(12) United States Patent
Teradaira et al.

(10) Patent No.: US 6,693,717 B1
(45) Date of Patent: Feb. 17, 2004

(54) PRINTING APPARATUS, AN INITIALIZATION METHOD THEREFOR, AND A PROGRAM STORAGE MEDIUM

(75) Inventors: Mitsuaki Teradaira, Shiojiri (JP); Atsushi Nishioka, Shiojiri (JP); Yuji Kawase, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/364,174

(22) Filed: Jul. 29, 1999

(30) Foreign Application Priority Data

Jul. 29, 1998 (JP) .......................................... 10-214593

(51) Int. Cl.[7] .............................................. G06K 15/00
(52) U.S. Cl. ...................................... 358/1.14; 358/1.13
(58) Field of Search .............................. 358/1.14, 1.15, 358/401, 501, 421, 422, 423, 1.13

(56) References Cited

U.S. PATENT DOCUMENTS

| | | | |
|---|---|---|---|
| 4,678,316 A | 7/1987 | Abuyama | 399/70 |
| 5,325,209 A | 6/1994 | Manabe | 358/437 |
| 5,457,516 A | 10/1995 | Kim | 399/37 |
| 5,847,726 A * | 12/1998 | Hori | 347/23 |
| 6,099,181 A * | 8/2000 | Kitabatake | 400/710 |
| 6,246,488 B1 * | 6/2001 | Murata | 358/1.14 |

FOREIGN PATENT DOCUMENTS

| | | |
|---|---|---|
| EP | 0 911 172 | 4/1999 |
| JP | 7-81073 | 3/1995 |
| JP | 8-142450 | 6/1996 |
| JP | 10-151836 | 6/1998 |
| WO | WO99/22941 | 5/1999 |

\* cited by examiner

Primary Examiner—Jerome Grant, II
(74) Attorney, Agent, or Firm—Mark P. Watson

(57) ABSTRACT

Waste of consumables and a loss of mechanical durability resulting from interruption of printer initialization processes by reset requests sent to the printer by a host device during the host startup process are prevented. The printer has a power on initialization controller for initializing the printer when printer power is turned on; and a first timer for measuring a first predetermined time after the printer starts operating. The power on initialization controller performs a first initialization process if the first predetermined time monitored by the first timer has not passed. After this first predetermined time passes, the power on initialization controller performs a second initialization process differing from the first initialization process.

27 Claims, 9 Drawing Sheets

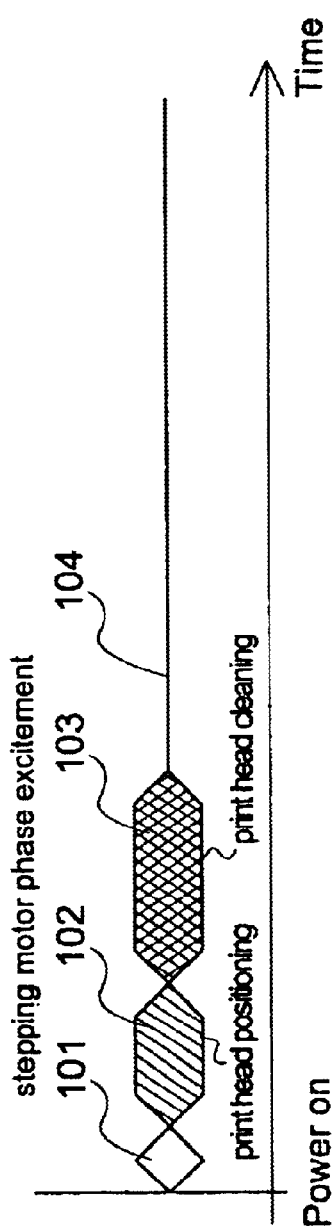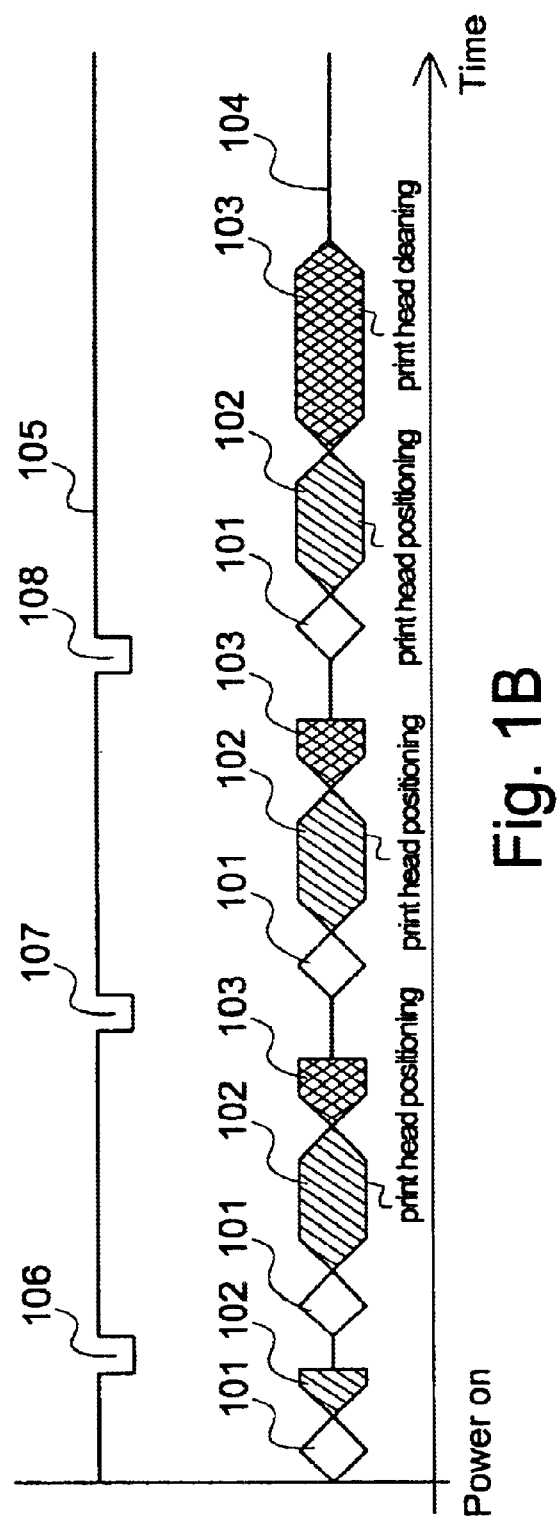

PRINTING APPARATUS, AN INITIALIZATION METHOD THEREFOR, AND A PROGRAM STORAGE MEDIUM

BACKGROUND OF THE INVENTION

1. Field of the Invention

The present invention relates to a printing apparatus (a printer), a printer initialization method, and a computer-readable data storage medium recording a program for controlling a printer. More particularly, the present invention relates to an initialization process that is accomplished when the printer is turned on, and an initialization process that is accomplished in response to a printer reset request from a host device.

2. Description of the Related Art

Printing apparatuses (referred to below as "printers") typically perform a predetermined printer initialization process when the printer power is turned on, when the printer begins operation, and also when a reset request is received by the printer from a host computer or from the host device in a point-of-sale (POS) terminal with which the printer is used.

Systems in which the power supplies of the printer and host device are linked such that the printer and host device power turns on substantially simultaneously are widely used, for example, in POS systems. When printer power turns on in conjunction with host power in such systems, the host device BIOS (basic input output system) typically sends a reset request to the printer. Then, the operating system (OS) that runs on the host device sends a reset request to the printer, and then the application program that runs on the OS sends another reset request to the printer. This means that when a conventional printer that executes a predetermined printer initialization process when the power is turned on is used in this type of system, multiple reset requests are asserted by the host to the printer before the printer can complete the predetermined initialization process caused by the power-on reset of the printer.

When the printer receives a reset request from the host device, the printer CPU controlling general printer operation is reset. This causes CPU operation to stop and drives all I/O ports to a high impedance state, thus interrupting any initialization process that was started when printer power was turned on and is still in progress when the reset request from the host device is received.

Problems Relating to Initialization Process Interruption

Printer initialization typically includes the following tasks:

a) initializing such control circuits as the CPU controlling printer operation, and RAM used as a communications buffer for communicating with the host device;

b) excitement of the stepping motor phase for matching the operating phase of, for example, the stepping motor for driving the print head in the line direction;

c) a cleaning process for cleaning the printing elements of the print head to assure print quality; and d) moving the print head to a reference position in the line direction.

Some of these initialization processes require more time than others. For example, phase excitement of the stepping motors requires relatively little time, while print head positioning and print head cleaning require relatively more time.

The cleaning process required to clean an ink jet print head includes a suction step in which a vacuum pump is used to suction ink from the print head, and thus consumes a quantity of ink. It also takes time for suction to actually begin once the vacuum pump starts operating, and interrupting the cleaning process is therefore also a wasteful use of time. Yet further, interrupting this cleaning process once ink suction has begun means the amount of ink that has been drawn so far is unknown. The suction step can therefore not be resumed, and must be repeated from the beginning. This obviously consumes more ink than does completing the suction step uninterrupted.

Problems Relating to Reseating the Initialization Process

When reset requests are repeatedly issued, the initialization process is performed in response to each reset request. This causes the following problems.

A stepping motor must be driven to position the print head to the reference position. The gear set, including the gears connected to the stepping motor, is therefore driven to move the print head, and repeating this positioning process in response to redundant reset requests needlessly advances wear on the associated mechanical parts.

It is also not normally possible to know where the print head is positioned when this operation starts. It is therefore necessary to move the print head to a known position against a stopper, and repeatedly driving the print head against this stopper can result in damage to the print head.

Repeatedly performing the cleaning process described above also consumes a needlessly large amount of ink, and thus makes it necessary to replace the ink cartridge sooner.

Repeatedly performing the initialization process is illustrated in FIGS. 1A and 1B. FIG. 1A shows the sequence of processes performed when printer power is turned on independently of the host device, such as when printer power is turned on after the host is operating.

The first step of this initialization process after the power is turned on is stepping motor phase excitement 101, followed by print head positioning 102, and then print head cleaning 103. The printer then proceeds to normal operation 104 in which the printer waits for a print command and data from the host device.

FIG. 1B shows a sequence of processes typically performed when a conventional printer is connected to a host device such that power supply to both the printer and host device begins substantially simultaneously with the resultant reset requests from the host device as described above. In FIG. 1B, a reset signal is asserted by the host device to the printer at the rising edge following a drop in the reset signal output 105. As a result, low level pulses 106, 107, and 108 in the reset signal output 105 indicate reset signals received by the printer.

After the printer completes stepping motor phase excitement 101, and print head positioning 102 is in progress, it receives a reset signal 106 from the host device BIOS. Print head positioning 102 is therefore interrupted, and stepping motor phase excitement 101 and print head positioning 102 are repeated from the beginning.

Next, stepping motor phase excitement 101 and print head positioning 102 are completed, and a reset signal 107 is received from the host device OS while print head cleaning 103 is in progress. Print head cleaning 103 is therefore interrupted, and stepping motor phase excitement 101, print head positioning 102, and print head cleaning 103 are repeated from the beginning.

Next, reset signal 108 is received from the host device application program while print head cleaning 103 is in progress. Print head cleaning 103 is therefore again interrupted, and stepping motor phase excitement 101, print head positioning 102, and print head cleaning 103 are again repeated from the beginning.

OBJECTS OF THE INVENTION

In consideration of the above-described problems, an object of the present invention is to prevent wasting of consumables in the printing apparatus, and to prevent a loss of mechanical durability that results when a printer initialization process, performed when printer power is turned on, is interrupted by a printer reset signal asserted by a host device to the printer immediately after host power turns on.

SUMMARY OF THE INVENTION

To achieve the above object, a printing apparatus according to the present invention for printing on a printing medium (e.g. paper) using a print head according to data received from a host device comprises: a power on initialization controller for initializing the printing apparatus when the printing apparatus power is turned on; and a first timer for measuring a first predetermined time after the printing apparatus starts operating. The power on initialization controller performs a first initialization process before the first timer finishes measuring the first predetermined time, and performs a second initialization process differing from the first initialization process after the first timer finishes measuring the first predetermined time.

The first initialization process performed by this power on initialization controller before a first predetermined time passes after printer operation starts includes operations that can be completed in a short time and which if interrupted will not lead to problems such as described above. Such operations include, for example, initializing control circuits and stepping motor phase excitement. After this predetermined time passes a second initialization process is performed and includes operations which, if interrupted, can lead to problems. This second initialization process includes, for example, print head cleaning and print head positioning. If this predetermined time is set based on the time required for all reset requests, which are asserted by the host device at host device startup, to be sent from the host, the problems arising from interrupting the initialization process performed when printer power is turned on can be avoided.

A printing apparatus according to the present invention further preferably comprises a reset initialization controller for initializing the printer according to a reset request from the host device. In this case the reset initialization controller performs a third initialization process in response to a reset request before the first timer finishes measuring the first predetermined time, and performs in response to a reset request a fourth initialization process that is not the same as the third initialization process after the first timer finishes measuring the first predetermined time.

In response to reset requests from the host device occurring within a predetermined time after printer operation starts, such as reset requests issued immediately after host device power is turned on, the reset initialization controller thus performs a third initialization process including operations that can be completed in a short time and which, if interrupted, will not lead to problems such as described above. Such operations include, for example, initializing control circuits and stepping motor phase excitation. A complete initialization process including print head cleaning and print head positioning can then be performed in response to reset, requests, such as reset requests issued in conjunction with a printing request, from the host after this predetermined time has expired. Problems arising from the initialization process being interrupted by frequent reset requests asserted immediately after host device power is turned on can therefore be avoided.

The third initialization process in this case is preferably substantially the same as the first initialization process. The initialization process performed when power is turned on, and the initialization process based on a reset request from the host device, can thus be accomplished by means of the same circuits or software. This is accomplished by, for example, connecting the reset terminal of the CPU to the output of the logical OR of the reset signal asserted when power is turned on and the reset signal received from the host device.

Further preferably in this case, the third initialization process is included in the fourth initialization process. As a result, processing reset requests from the host device can be started using the same circuit or software with the processing of such request branching after completing the third initialization process based on the whether or not the predetermined time has passed. A simple circuit or software design is used for this process. For example, a reset signal from the host device is input to the CPU interrupt terminal, and the value of a timer is evaluated during the interrupt process to determine which process is to be run.

Yet further preferably the printing apparatus of the present invention comprises nonvolatile memory for storing time data corresponding to the first predetermined time; and a data changing circuit for updating the time data corresponding to the first predetermined time stored in the nonvolatile memory.

In this case it is possible to dynamically change the predetermined time according to the host device characteristics, or more specifically the period in which frequent reset requests are asserted by the host device immediately after the power is turned on, and this predetermined time can be maintained even after printer power is turned off. In addition, the predetermined time can be adjusted and the above-described benefits obtained even when the host device is replaced.

Yet further preferably the printing apparatus of the present invention comprises a command detector for detecting a predetermined command in data received from the host device. In this case the data changing circuit can update the time data according to the predetermined command detected by the command detector.

In this case the above-noted predetermined time can be set by the host device to a value optimized for the characteristics of the host device by way of the printer interface. Such a host device function is preferably incorporated into the host device BIOS or other basic host device program.

Yet further preferably the printing apparatus of the present invention comprises a reset detecting circuit for detecting a last startup reset request, which is a last reset request in a plurality of reset requests generated by the host device startup process; and a second timer for measuring a time elapsed from the start of printing apparatus operation to the last startup reset request as detected by the reset detecting circuit. In this case the data changing circuit can update the time data based on the time measured by the second timer.

In this case the printer includes a learning function whereby it can automatically determine the best predetermined time based on the time required to receive the last of the reset requests frequently occurring immediately after host device power turns on. This learning function further increases the adaptability of the printer to various host devices.

Yet further preferably the printing apparatus of the present invention comprises a second timer for measuring from the start of printing apparatus operation a second predetermined time that is longer than the first predetermined time. In this case the reset detecting circuit detects as the last startup reset request the last reset request generated before the third timer finishes measuring the second predetermined time.

By defining a maximum value that could be used for the first predetermined time, and assigning this value to the second predetermined time, the first predetermined time can be set within the range below this maximum value. It is therefore possible to prevent an infinite delay in the start of the second initialization process, and the printer startup time can be regulated.

Yet further preferably the data changing circuit adds a predetermined deviation time to the time measured by the second timer to generate the time data, and stores this time data in nonvolatile memory. It is therefore possible to account for slight variations in host device characteristics, and stable initialization can thus be achieved.

Yet further preferably the printing apparatus of the present invention comprises a mode selector for selecting and setting the initialization mode of the power on initialization controller to a first mode or a second mode. In the first mode the power on initialization controller performs a first initialization process before the first timer finishes measuring the first predetermined time, and performs a second initialization process differing from the first initialization process after the first timer finishes measuring the first predetermined time. In the second mode the power on initialization controller performs the first initialization process and second initialization process before the first timer finishes measuring the first predetermined time.

When power is turned on to a printer thus comprised, it is determined, for example, whether print head cleaning is necessary. If it is necessary, then the first mode is selected; if not, the second mode can be selected. It should be noted that if the second initialization process is selected when cleaning is not necessary, the cleaning process is not included in the second initialization process. As a result, the second initialization process can be interrupted without resulting in unnecessary ink consumption. The second mode can therefore be selected in this case to perform all initialization processes without waiting for the predetermined time to pass, and thereby shorten the printer startup time.

It should be further noted that the present invention has the greatest benefit when interruption of the print head cleaning process can be avoided. The first and second initialization processes are therefore preferably mutually exclusive, and print head cleaning is preferably included in the second initialization process, that is, print head cleaning is preferably not included in the first initialization process.

It will be obvious that a printing apparatus according to the present invention as described above can also be expressed as a printing apparatus initialization method with the same effects and benefits described above.

The initialization method of the present invention is further preferably achieved using a computer. Also included in the present invention, therefore, is a computer-readable data storage medium storing program code for performing the initialization method of the present invention.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts:

FIGS. 1A and 1B show a typical initialization process sequence of a conventional printer in which printer initialization begins when printer power turns on;

FIG. 7 shows a process of operations performed in a printing apparatus according to the present invention when operation starts after power is turned on;

DESCRIPTION OF THE PREFERRED EMBODIMENTS

The preferred embodiments of the present invention are described below with reference to the accompanying figures. It is to be noted that the following preferred embodiments are descriptive of the present invention, and not restrictive of the intended scope of the accompanying claims. It will also be obvious to one with ordinary skill in the related art that any or all of the elements described below can be replaced by other equivalent means to achieve the same effect, and such variations are considered to be included within the scope of the present invention.

Embodiment 1

Figure 2:
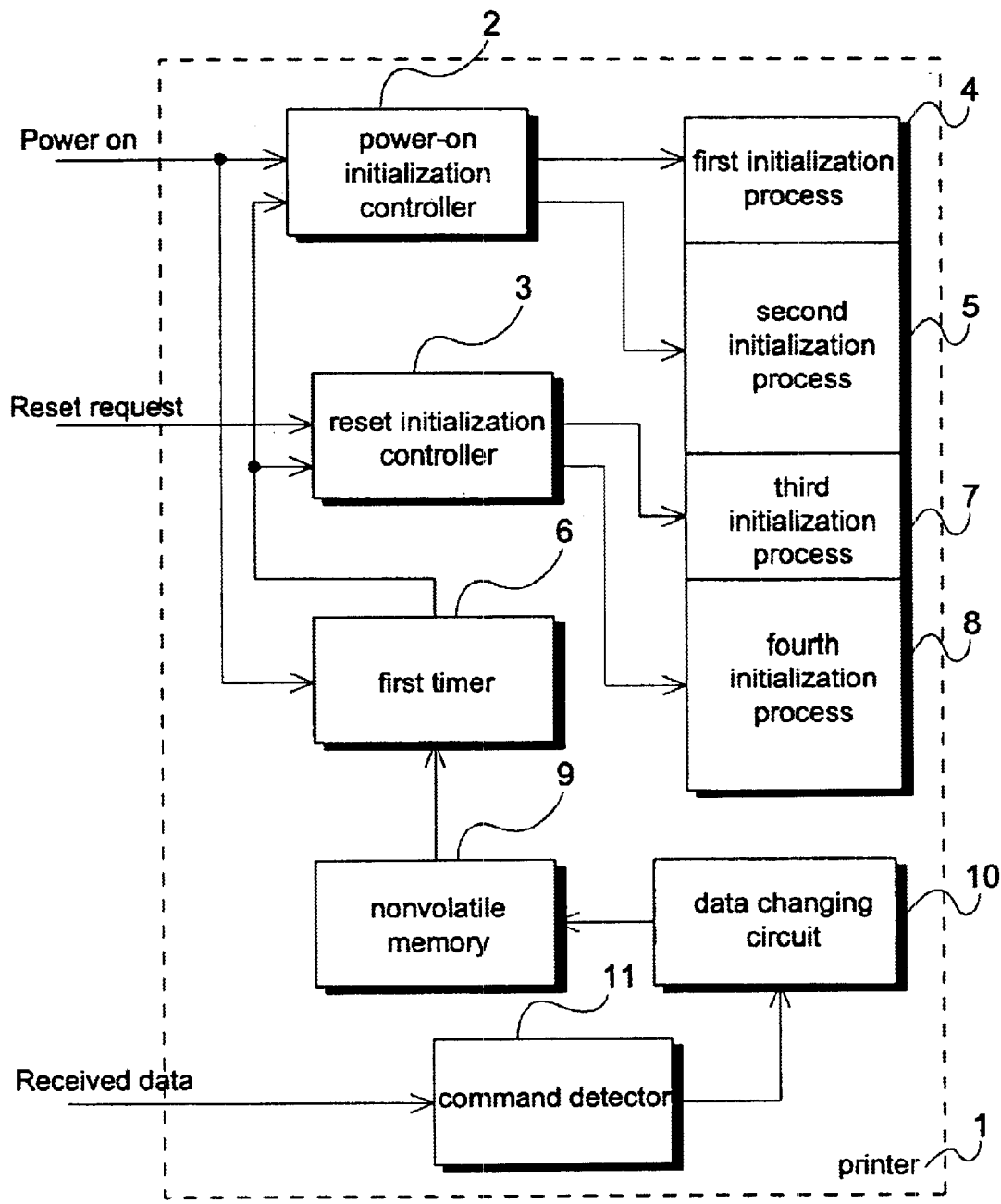
FIG. 2 is a block diagram of a printing apparatus according to a first preferred embodiment of the present invention.

FIG. 2 is a block diagram of a printing apparatus according to a first preferred embodiment of the present invention. Referring to FIG. 2, a power-on initialization controller 2 controls initialization of the printer 1 in response to printer power being turned on. A first timer 6 starts counting in response to printer power turning on, i.e., when printer 1 operation starts, and notifies the power-on initialization controller 2 and a reset initialization controller 3 when a predetermined time t1 elapses.

When printer power turns on, the power-on initialization controller 2 starts a first initialization process 4. As will be described more fully below, this first initialization process 4 comprises processes that can be completed in an extremely short period of time, such as control circuit initialization. When this first initialization process 4 ends, the power-on initialization controller 2 waits for a notification from the first timer 6 that the predetermined period t1 has elapsed. If the power-on initialization controller 2 receives this notice, it begins a second initialization process 5.

This second initialization process 5 includes operations that require a relatively long period of time, such as print head positioning and print head cleaning, if the printer is an ink jet printer.

When this second initialization process 5 ends, the printer 1 enters a normal printing process standby state. When the printer 1 receives a print command and data from the connected host device, it performs a normal printing process according to the received print data.

When the printer 1 receives a reset request from the host device or other external device, the reset initialization controller 3 initializes the printer 1 in response to the reset request. The reset initialization controller 3 determines whether the predetermined period t1 has elapsed since the printer power was turned on, based upon the output from the first timer 6.

If the period t1 has not elapsed, the reset initialization controller 3 performs a third initialization process 7. This third initialization process 7 preferably includes tasks that can be completed in a short time, similarly to the first initialization process 4, and further preferably includes only tasks which, if interrupted, will not result in undesirable consequences, such as wasted ink, wear, etc. It is to be noted that this third initialization process 7 can be the same as the first initialization process 4. An initialization process of the same level as that performed when printer power turns on can thus be performed in response to a reset request, and printer 1 reliability can thus be improved.

If the period t1 counted by the first timer 6 has elapsed when a reset request is received, the reset initialization controller 3 performs a fourth initialization process 8. This fourth initialization process 8 is performed alternatively to the third initialization process 7, and, in addition to the tasks of the third initialization process 7, includes such relatively time-consuming tasks as print head positioning and ink jet head cleaning; that is, tasks equivalent to those performed in the second initialization process 5. It is to be noted that this fourth initialization process 8 can be a combination of the first and second initialization processes 4 and 5.

The predetermined time t1 counted by the first timer 6 is stored in nonvolatile memory 9, and can be changed as desired by the data changing circuit 10.

Data received from a host device by a printer 1, according to this preferred embodiment of the invention, is interpreted by a command detector 11. If the command detector 11 detects a command requesting that the predetermined period t1 counted by the first timer 6 and stored in nonvolatile memory 9 be changed, it can instruct the data changing circuit 10 to change the stored time based on the received command and accompanying parameters.

Figure 3:
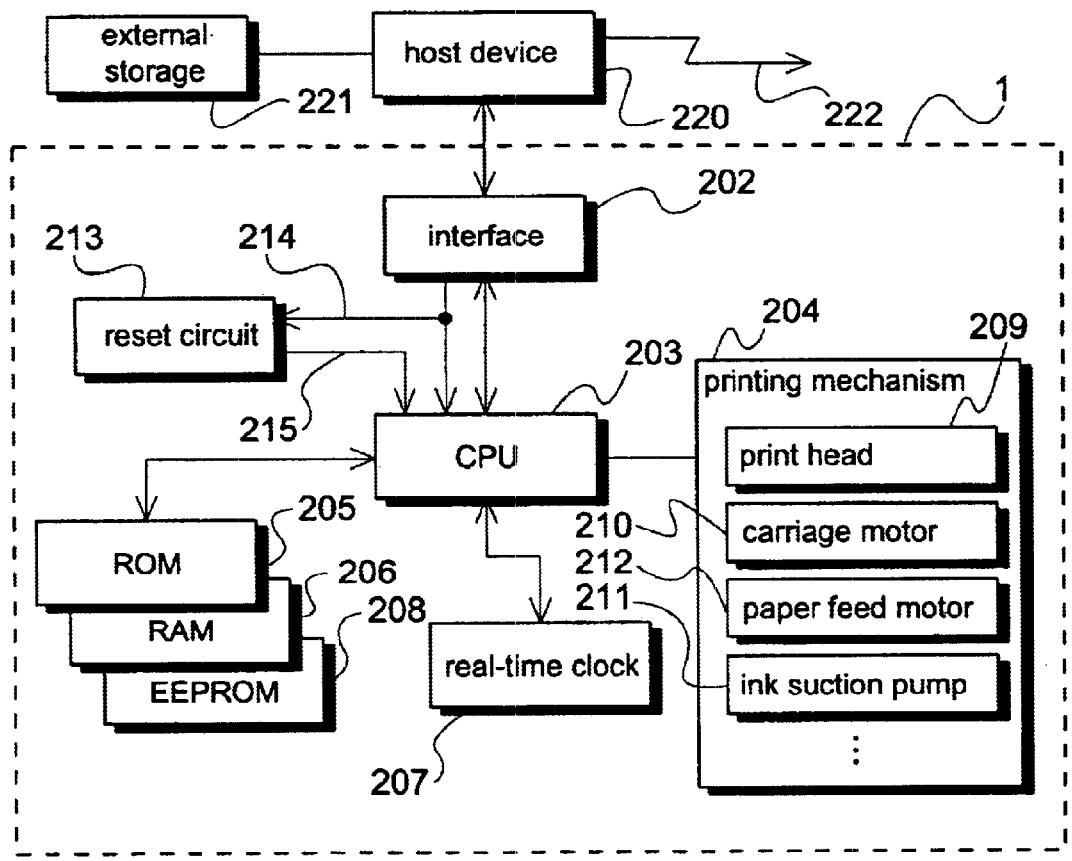
FIG. 3 is a circuit block diagram of a printing apparatus according to a preferred embodiment of the present invention.

Referring next to FIG. 3, the basic circuits of the printing apparatus shown in FIG. 2 according to this preferred embodiment are described next.

Control commands sent from the host 220 to the printer 1 are received through an interface 202. The CPU 203 interprets control commands received by the interface 202 to drive the printing mechanism 204 for printing text and/or graphics on paper or other printing medium.

In addition to control commands, the host 220 can also send a reset request through the interface 202 to the printer 1. It is to be noted that a reset request is sent through the interface 202 to reset circuit 213 as an external reset signal in a printer 1 according to this exemplary embodiment of the invention, but the invention shall not be so limited. A reset request command can be alternatively sent through interface 202 to CPU 203, for example. It is to be noted, however, that if the CPU 203 is not operating normally, this reset request command may not be normally executed. It is therefore preferable for a reset request command or external reset signal to be interpreted by a circuit independent of the CPU.

In this exemplary embodiment an external reset signal 214 is input to and detected by the CPU 203. It is also input to a reset circuit 213. This reset circuit 213 is typically used as a power supply monitoring IC, and resets the CPU 203 by supplying a reset pulse 215 to the reset terminal of the CPU 203 for a predetermined time after the supply voltage stabilizes to a normal level when power is supplied to the printer 1. In this exemplary embodiment a reset pulse is also asserted in response to an external reset signal received through the interface 202. This is to prevent runaway CPU 203 operation by asserting a reset pulse 215 of a predetermined width even when the pulse width of an external reset signal is extremely short. This can be achieved, for example, with a wired-OR connection of the negative logic external reset signal from the interface circuit to the voltage monitoring terminal of the voltage monitoring circuit.

It is also possible to use an external reset signal input directly to the CPU 203 as a reset warning signal by delaying the external reset signal 214 a predetermined time and then generating the reset pulse 215. The CPU 203 is thus allowed a predetermined time (dt1) between when the external reset signal 214 is detected and the CPU 203 is reset by the reset pulse 215. The CPU 203 thus has enough time to handle such required processes as setting an external reset flag before the CPU 203 resets. It is to be noted that this delay time dt1 can be easily achieved by such means as a delay line, a timer circuit, or a counter. Furthermore, this predetermined time dt1 can be used more effectively by detecting the external reset signal 214 in real time, and in this preferred embodiment the external reset signal 214 can be applied to a non-maskable interrupt (NMI) terminal of the CPU 203.

The processes performed by the CPU 203 are defined by a program stored in ROM 205. When power to the printer 1 is turned on, the CPU 203 runs a program stored in ROM 205 starting from a predetermined address in response to the reset pulse 215 from the reset circuit 213. The CPU 203 typically reads the program from ROM 205 into RAM 206, and runs the program from RAM 206. By loading the program to RAM 206, the program can be modified to dynamically change the predetermined reset process(es) performed.

The CPU 203 creates in RAM 206 images of the text and/or graphics to be printed, and drives the printing mechanism 204 based on these images. The CPU 203 uses font data stored in ROM 205 to generate an image of text to be printed based on character codes.

A real-time clock 207 counts the time in seconds, for example. The CPU 203 is connected to real-time clock 207 by way of an interconnecting I/O port or bus so that it can obtain the current time as required. Real-time-clock 207 may comprise real-time clock ICs with an internal timer function, as are known in the art. Using such devices it is possible for the CPU 203 to set the timer to generate a CPU interrupt at a predetermined time.

Nonvolatile memory 208 such as Flash ROM or EEPROM devices can be rewritten with information from the CPU 203 when power is supplied to the printer 1, and statically store the information even when the power is turned off. It is to be noted that such functionality can also be achieved by, for example, adding a battery backup circuit to static RAM (SRAM) devices.

The printing mechanism 204 has a print head 209, a carriage motor 210 for moving the print head 209 parallel to the line printing direction, and a paper or printing medium feed motor 212 for transporting the paper or other printing medium. High precision positioning and improved print quality can be achieved by using stepping motors for the carriage and paper feed motors. It will be obvious to one with ordinary skill in the related art that various other DC motors with encoder combinations can be alternatively used. An ink suction pump 211 is also needed for print head cleaning such as suctioning relatively high viscosity ink that has been left in the print head 209 for a period of time; that is, when the print head 209 is an ink jet head.

ROM 205 functions as a data storage medium for recording the printer 1 control program. If an EEPROM or other rewritable nonvolatile storage device is used in place of ROM 205, the control program content can be updated from the host 220, for example. It is also possible for the host 220 to store the printer control program in its own internal data storage, or for the control program to be stored on CD-ROM, a hard disk, floppy disk, or other external storage 221 accessible by the host 220. Yet further, this computer-readable data storage medium for storing the printer control program can be a network server or even the network itself, thus enabling the host device to download the control program via the Internet or other computer network.

As will become more fully understood below, the power-on initialization controller 2 of the present exemplary embodiment of the invention comprises a reset circuit 213, CPU 203, and memory (ROM 205 and RAM 206), and the reset initialization controller 3 comprises interface 202, reset circuit 213, CPU 203, and memory.

The first timer 6 comprises real-time clock 207, CPU 203, and memory. Nonvolatile memory 9 comprises EEPROM 208, data changing circuit 10 comprises CPU 203 and memory, and command detector 11 comprises CPU 203 and memory.

Although for the sake of illustration, each of the above-described units are shown separately, it will be appreciated that that these units may be implemented with discrete components, application specific integrated circuits, processors executing appropriate software and the like or any combination thereof.

Figure 9:
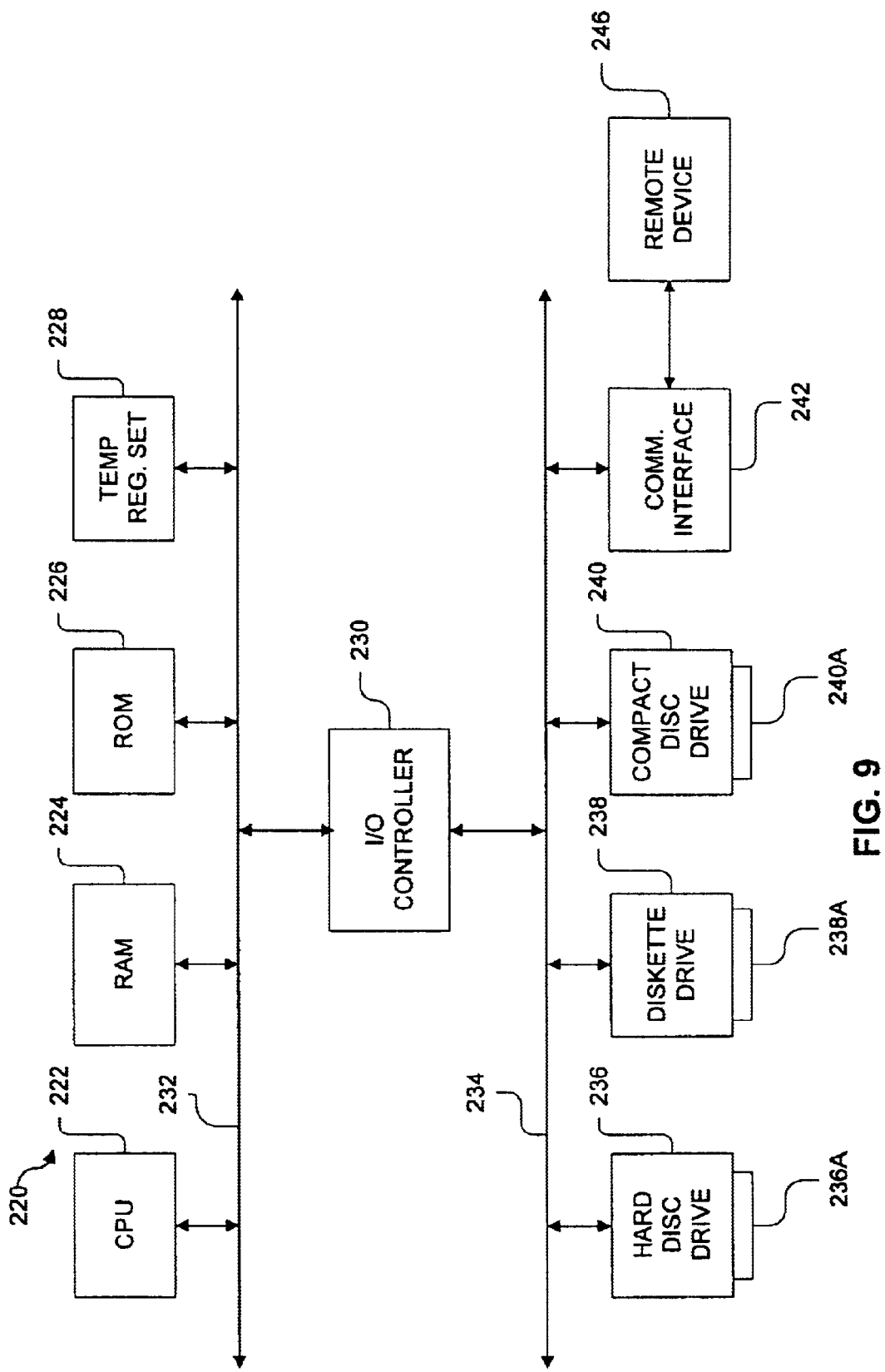
FIG. 9 is a block diagram of the major functional units of the host device of the present invention.

As shown in FIG. 9, host device 220 may further include, for example, a central processing unit (CPU) 222, memories including a random-access-memory (RAM) 224, read-only memory (ROM) 226 and temporary register set 228, and an input/output controller 230, all connected to an internal bus 232.

Operating system software and/or application specific software for operating the host device 220 and/or the printer 1 and/or the various functional units described herein may be stored in any combination of the memories 224, 226 and 228 or may be stored externally in one or more of the I/O units including hard disc drive unit 236, diskette drive unit 238, and compact disc drive 240, each connected to I/O Bus 234. Software for operating the various functional units and/or for implementing the method of the present invention may be stored on a medium such as hard disc 236A, diskette 238A or compact disc 2400A, each of which may comprise external storage 221 (FIG. 3) or may be stored at a remote device 246 and input through communications interface 242. The software program for performing the method of the present invention may be embodied on a carrier wave and input to the host device 220 through communications interface 242. The remote device may be the internet or a network such a local network (IAN) or wide area network (WAN), for example. The remote device 246 may also include the printer 1 and the communications interface may include an RS-232C port, for example, enabling two-way communication between the host device and printer.

Figure 4:
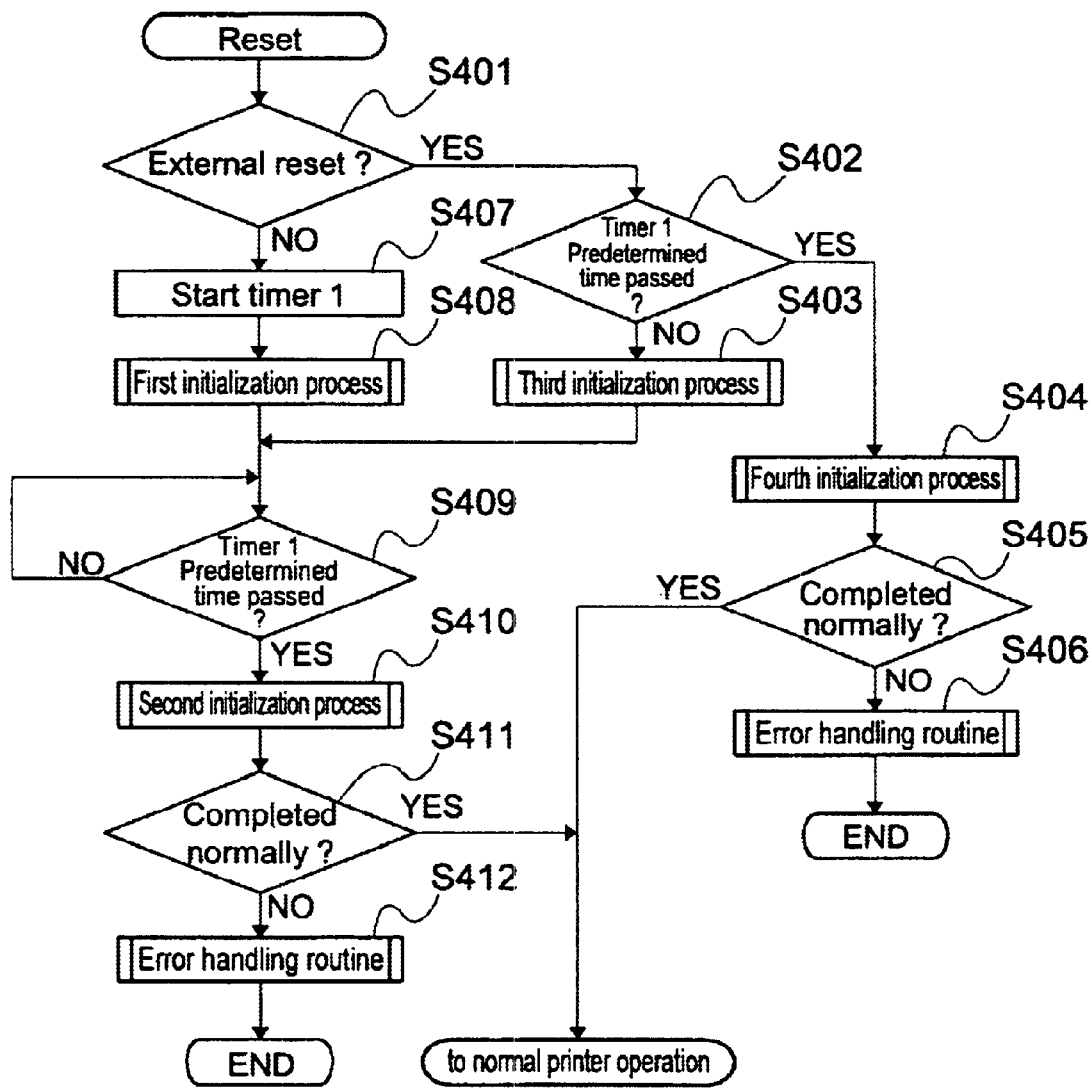
FIG. 4 is a flow chart of an initialization process in a printing apparatus according to a first preferred embodiment of the present invention.

A process for controlling the startup operation of a printer 1, according to the preferred embodiment of FIG. 3, when printer power is turned on is described next with reference to the flow chart in FIG. 4.

As noted above, the reset circuit 213 outputs a reset pulse 215 when the supply voltage stabilizes after printer 1 power is turned on. It is to be noted that reset pulse 215 is held at an active level until the supply voltage reaches a certain level. When the supply voltage reaches a predetermined level and a predetermined period then passes, more specifically, when time sufficient for the CPU 203 to complete an internal circuit initialization operation passes, the reset pulse 215 goes inactive, and the CPU 203 begins running the process shown in FIG. 4 starting from decision diamond S401.

At decision diamond S401 the CPU 203 detects the cause for the reset operation, that is, whether the CPU 203 reset in response to an external reset signal or because the power was turned on. This is determined, for example, by evaluating the state of an external reset flag, which is set when the CPU 203 detects an external reset signal 214. Note that this external reset flag is reset (cleared) when power supply stops. Preferably, therefore, the external reset flag is stored in memory in which the default state when power is turned on is assured to be a reset (cleared) state of the external flag, or the external reset flag is stored in EEPROM and the address area in which it is stored is instantaneously cleared to assume the reset state of the external flag when the power supply is stopped.

In this exemplary embodiment of a printer according to the present invention, the activated external reset flag and an external reset signal detection time are stored in EEPROM 208 in a non-maskable interrupt (NMI) process that is started by external reset signal 214. The CPU 203 then checks this external reset flag in step S401, and determines that the CPU 203 reset due to an external reset if the flag is set, and due to the power turning on if the flag is not set. As an additional check in step S401, the CPU 203 then compares the reset time obtained from the real time clock 207 with the NMI time which has been stored in the NMI process. If the difference therebetween is not the time corresponding to the above-noted delay time (i.e., the predetermined delay time dt1 set to allow the CPU enough time to handle such required processes as setting an external reset flag before the CPU 203 resets), then the CPU 203 determines, regardless of the external reset flag state, that a power-on reset occurred. This prevents determination errors that could result, for example, when a power-on reset occurs immediately after the external reset signal 214 is asserted.

If the CPU 203 determines that a power-on reset occurred, it starts a timer (first timer 6) at step S407, and performs the first initialization process 4 in step S408. As noted above, this first initialization process 4 includes processes that will not cause any problems if interrupted, such as control circuit initialization and phase excitation of the stepping motors used for the carriage motor 210 and paper feed motor 212.

Based on the first timer 6, decision diamond S409 determines whether the above-noted predetermined time t1 has passed since the start of CPU 203 operation due to printer power turning on, and CPU 203 waits until this time passes. When this predetermined time t1 passes, the second initialization process 5 is performed. As noted above, this second initialization process 5 includes processes that take relatively longer to complete and which can be the source of a problem if interrupted. These include in this exemplary embodiment, for example, cleaning the print head 209 and positioning the print head 209 with carriage motor 210 as described above.

Decision diamond S411 then determines whether the first and second initialization processes finished normally. If not, an error handling routine (S412) is performed. Otherwise the printer proceeds to normal operation.

It is to be noted that the first timer in this exemplary embodiment comprises a real-time clock 207. That is, the current time is read from the real-time clock 207 in step S407, the difference between the current time obtained again from the real-time clock 207 and the stored time is then calculated in step S409, and this difference is compared with a specific predetermined value t1. The present invention shall not be so limited, however, and various other means can be used to the same effect. For example, a real-time clock having a timer function can be used and set to a predetermined time t1 in step S407. Then when this preset time t1 is detected by the timer, the clock asserts an interrupt and a flag is set to indicate the predetermined time has passed. Then in step S409 the state of this flag is checked. Yet further alternatively, the first timer can comprise a counter or timer that is not affected by resetting the CPU 203.

Referring again to FIG. 4, if decision diamond S401 detects an external reset, the CPU 203 sets the external reset flag, and detects whether the above-noted predetermined time t1 has passed since the start of CPU 203 operation due to printer power turning on (S402). If this time t1 has not passed, the third initialization process 7 is performed (S403), and the procedure advances to the above-noted step S409. If this time t1 has passed, the fourth initialization process 8 is performed (S404), as a result of and in response to external reset signal 214. The CPU 203 then detects whether the initialization process completed normally (S405). If not, an error handling routine (S406) is performed. Otherwise the printer proceeds to normal operation and waits for a print command and data from the host 220.

It is to be noted that the above-noted error handling routines (S406, S412) typically drive LEDs or other indicators on the printer, or pass an error signal through interface 202 to the host 220, to notify the operator that an error has occurred.

Figure 7:
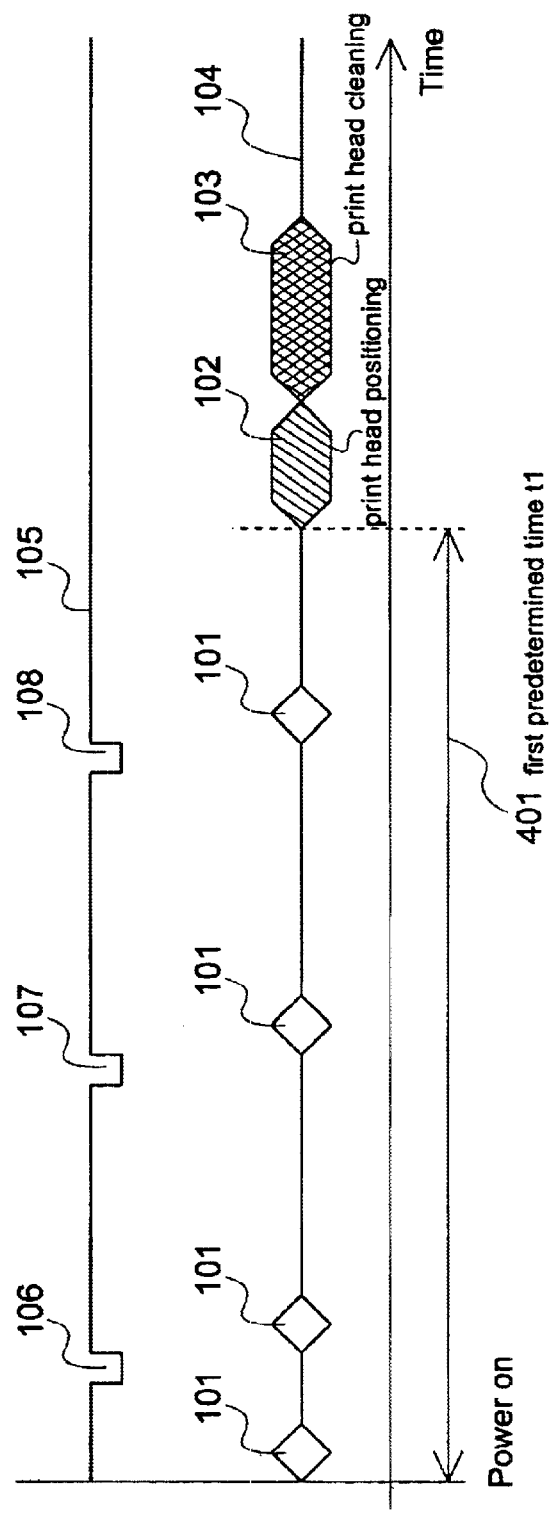

An exemplary initialization sequence when power is turned on to a printer according to this preferred embodiment of the present invention is shown in FIG. 7 and described below. Note that FIG. 7 shows the sequence of processes performed when the power is turned on and a printer according to the present invention starts.

As will be evident from comparing FIG. 7 with the sequence shown in FIG. 1B, the first initialization process 4 (step S408), which includes, for example, stepping motor phase excitement 101, is performed each time an external reset signal 214 is received (at reset pulses 106, 107, and 108); but, the second initialization process 5 (step S410), which includes, for example, print head positioning 102 and print head cleaning 103, is not performed each time the external reset signal is received. This second initialization process 5 (S410) is performed only after a first time t1 (401 in FIG.7) passes (step S409). In addition to preventing the second initialization process from being repeatedly performed, with the accompanying needless wear of mechanical parts and large ink consumption, this method enables initialization of the printer to complete as quickly as possible in response to the needs of the operating environment of the host device to which the printer is connected.

It is to be noted that the predetermined delay time dt1 and predetermined threshold times, e.g. t1, used to determine which initialization process is performed can be fixed values stored in ROM 205, or a plurality of values can be stored and selected according to predetermined DIP switch settings, for example.

When a reset signal is received by the printer 1 from host 220 after proceeding to a normal printing process, the fourth initialization process 8 can be immediately performed as it is in a conventional printer.

The printing apparatus according to the present invention have been described above using an ink jet printer by way of example. The invention shall obviously not be so limited, and a variety of other printing mechanisms can be alternatively used, including dot impact, thermal, and electrophotographic. The present invention can be applied with these and other types of printers by handling in the second initialization process any initialization tasks that require a certain amount of time or that should preferably not be repeatedly performed.

Embodiment 2

Figure 5:
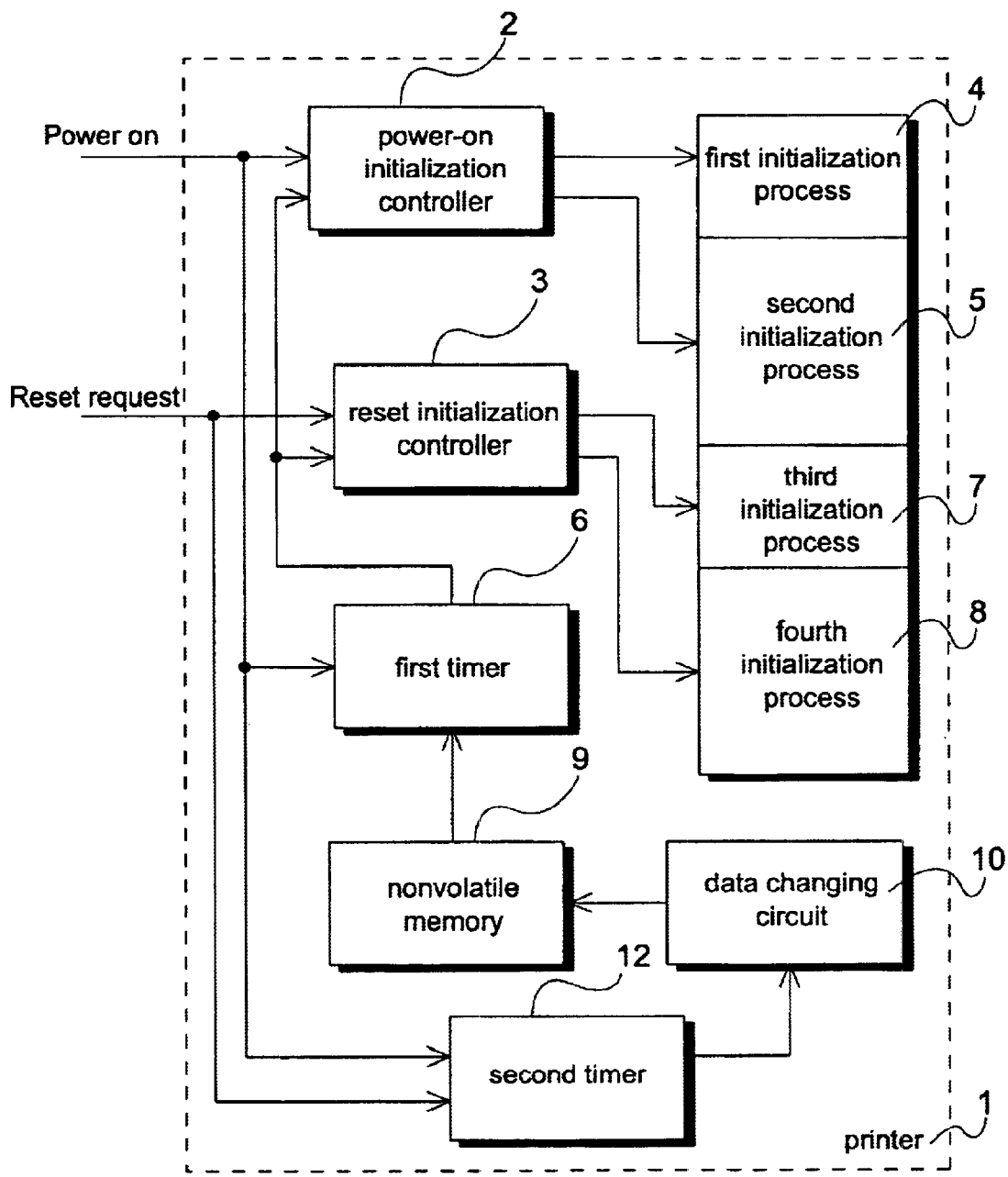
FIG. 5 is a block diagram of a printing apparatus according to a second preferred embodiment of the present invention.

FIG. 5 is a block diagram of a printing apparatus according to a second preferred embodiment of the present invention. It is to be noted that like parts in this and the first embodiment described above with reference to FIG. 2 are identified by like reference numerals, and further description thereof is omitted below.

This printer 1 improves upon the printer according to the first embodiment in the means for changing the first predetermined time t1 to be set to the first timer 6. That is, a printer 1 according to this second embodiment further comprises a second timer 12 for counting a second predetermined time t2 starting when printer power turns on. This second timer 12 further compares this second predetermined time t2 with the reset request input time to determine an optimal value to be used for the first predetermined time t1. The first predetermined time t1 stored in nonvolatile memory 9 is then updated to a new, optimal first predetermined time t1 by means of data changing circuit 10.

The hardware configuration of a printer 1 according to this preferred embodiment can also be achieved as shown in FIG. 3. This is because the second timer 12 of this second embodiment can be achieved with real-time clock 207, CPU 203, and memory. Further description of the hardware design of this second preferred embodiment is therefore omitted below.

The initialization method of a printer 1 according to this preferred embodiment is described next below with reference to the flow chart in FIG. 6. It is to be noted that the flow chart of this initialization method is substantially identical to that of the first embodiment shown in FIG. 4. Like steps are therefore indicated with like reference numerals, and further description thereof is thus omitted below.

Figure 6:
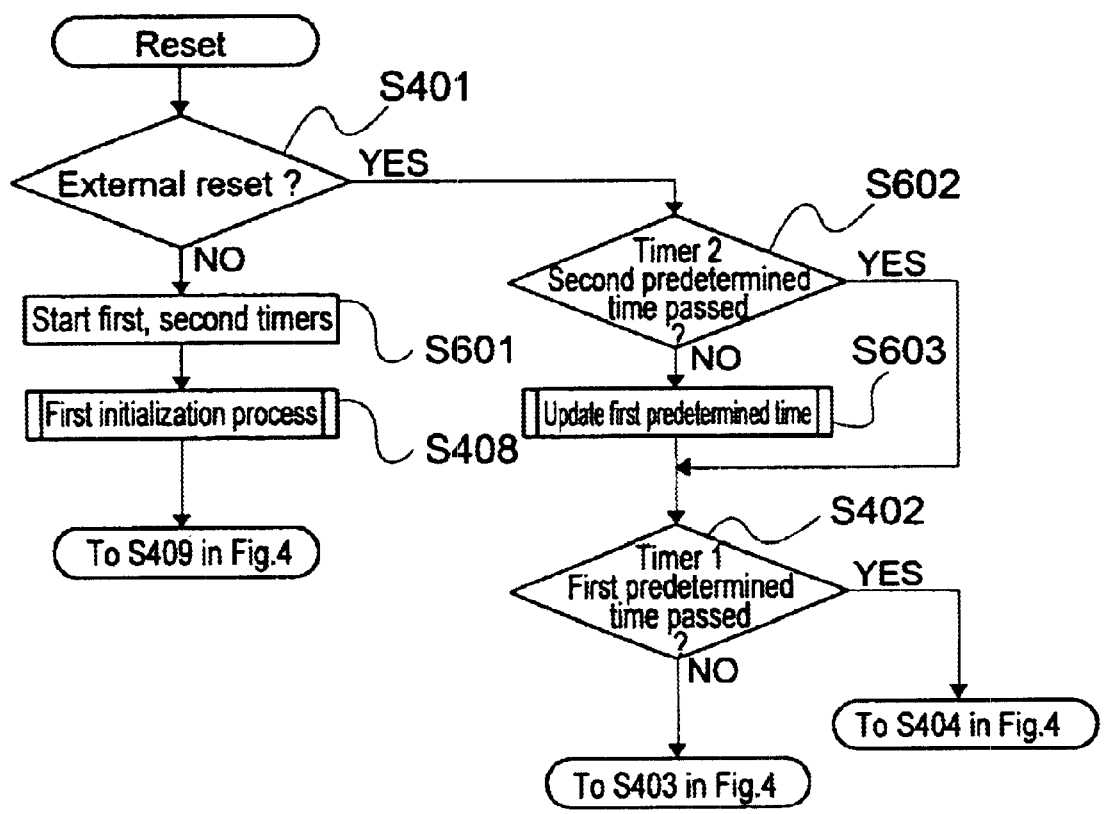
FIG. 6 is a flow chart of an initialization process in a printing apparatus according to a second preferred embodiment of the present invention.

When power turns on, the reset circuit 213 generates a reset pulse 215 causing the process shown in FIG. 6 to start. As described above with reference to FIG. 4, the first step in this process is to determine whether the reset was caused by printer power turning on or by assertion of an external reset signal (S401). If step S401 determines that the cause is printer power being turned on, both first timer 6 and second timer 12 are started (S601). The first initialization process is then performed (S408) as described in the first embodiment above.

If decision diamond S401 determines the cause of the reset to be an external reset signal, decision diamond S602 detects whether the second timer 12 has reached the second predetermined time t2. If the second predetermined time t2 has not passed, the first predetermined time t1 to be counted by the first timer is updated to t1' in step S603. More specifically, the time which the second timer 12 has counted so far at step S602 is set as an updated first predetermined time t1'. It is important to note, however, that this value is subject to change in response to a subsequently occurring external reset since step S602 may be reached again in response to a subsequent external reset. This updated first predetermined time t1' value is therefore not used immediately as the setting for the first timer, which is currently counting the original first predetermined time t1 value. Instead, updated value t1' is first used the next time the first timer 6 is started, that is, at the next power-on reset.

Decision diamond S402 then detects whether the first predetermined time t1 has passed since printer power turned on.

If at decision diamond S602 the second predetermined time has passed, updating the first predetermined time value from t1 to t1' (S603) is skipped and decision diamond S402 detects whether the first predetermined time t1 has passed since printer power turned on.

This process sets the first predetermined time t1' that is used as the next setting for the first timer 6 according to the last occurring external reset that is generated between when power turns on and the expiration of the second predetermined time t2. More specifically, this first predetermined time t1' is defined as the time from a power-on state to this external reset plus a predetermined margin, which in this exemplary embodiment is 4 seconds by way of example only. It is therefore possible to dynamically calculate the shortest possible first predetermined time t1' value according to the actual timing of successive reset signals asserted after the power is turned on by the host device to which the printer 1 is connected. This makes it additionally possible to start the second initialization process at the earliest possible time, and thus also complete the second initialization process earlier.

It will be evident that this second predetermined time t2 will be set to be longer than the projected combined total time of successive reset signals asserted when host device power is turned on. However, if the period of these successive reset signals is particularly long and this second predetermined time t2 is set even longer, the start of the second initialization process will be delayed, and completion of the power-on reset operation will be delayed. To avoid this, this second predetermined time t2 is set in this exemplary embodiment to a time that will normally allow for completion of the initialization process, that is, one minute.

It is to be noted that the initialization control method of a printer 1 according to this preferred embodiment differs as described above from the first embodiment, but is otherwise identical to the method of the first embodiment, that is, following steps S408 and S402, and further description thereof is thus omitted below.

It should also be noted that this second timer 12 can be comprised identically to the first timer 6, and further description thereof is thus omitted below.

Embodiment 3

The above-described first and second embodiments of the present invention resolve the problem of repeated printer resets occurring when the host device power turns on by using a first timer 6 to track a first predetermined time t1 and determine the initialization process to be performed based on whether or not this first predetermined time t1 has passed. With these embodiments, however, a second initialization process cannot begin until this first predetermined time t1 has passed, and the printer startup time, that is, the delay until the printer is ready to start a normal printing process, increases accordingly.

There are cases in which it is desirable not to use the initialization method of the first or second embodiment to delay the second initialization process. Such cases include when the processes corresponding to those of the above-noted second initialization process are not necessary, such as when print head cleaning is not necessary when the power is turned on, and when printer power is turned on after the host device is already running.

A printer according to this third embodiment of the present invention therefore appropriately chooses an initialization mode to selectively initialize the printer using a method according to the first or second embodiment of the invention, or using a conventional initialization process.

Figure 8:
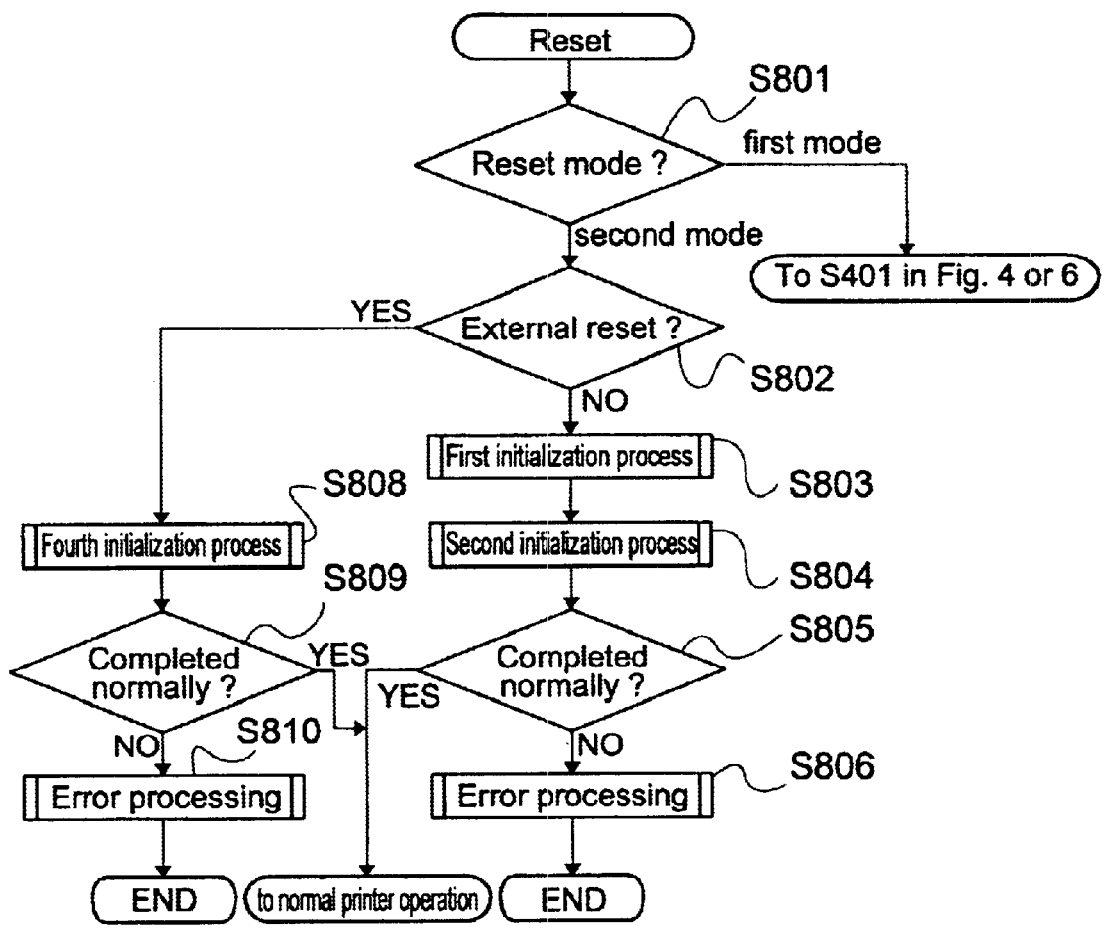
FIG. 8 is a flow chart of an initialization process in a printing apparatus according to a third preferred embodiment of the present invention.

Function and circuit block diagrams for a printer according to this third embodiment of the invention are identical to those of the above first and second embodiments of the invention. The initialization method differs, however, and is described below with reference to the flow chart in FIG. 8.

When printer power turns on, the reset circuit 213 sends a reset pulse 215 to the CPU 203 to effect a power-on reset operation. This reset pulse causes CPU 203 to begin the process shown in FIG. 8, and determine in step S801 which reset mode to use. More specifically, the CPU 203 determines whether to run a reset process according to the first or second embodiment of the present invention described above, or to run a conventional reset process.

his determination is made with reference to a DIP switch, for example, or other hardware setting device (not shown in the figures) disposed in the printer 1. Alternatively, a setting received as a control command from the host device can be stored in EEPROM 208, and this setting is retrieved to make the determination.

If step S801 selects a first mode (mode 1), a reset process according to the above first or second embodiment of the invention has been selected, and control passes to step S401. A process as described above with reference to the first or second embodiment is then performed. If step S801 selects a second mode (mode 2), the cause of the reset operation is detected in step S802. This process is the same as that of step S401, previously described.

If a power-on reset is detected, the first and second initialization processes are performed in steps S803 and S804. These processes are normally performed consecutively, and can therefore normally end before the first predetermined time t1 passes. Decision diamond S805 then detects whether the initialization processes have completed normally. If not, an error handling routine (S806) is performed. If initialization ends normally, the printer is ready for printing and awaits a print command and data from the host device.

If an external reset is detected in step S802, a fourth initialization process (S808) is performed. This initialization process is then followed by an error handling routine (S810) or normal printing process as described above.

It is to be noted that operation from step S401 is as in the above first and second embodiments, and further description thereof is thus omitted.

Each of the methods of the present invention are implemented, in one embodiment, in a software program or programs outlined in the flow diagrams and their accompanying descriptions set forth above. The software program or programs may be resident on printer 1, e.g. in memories 205, 206 and or 208, or resident on the host device 220, e.g. in ROM 226 or RAM 224, or stored on media such as hard disc 236A, diskette 238A or compact disc 240A, or may be stored at a remote device 246 and input through communications interface 242. The software program for performing the method of the present invention may be embodied on a carrier wave and input to the host computer through communications interface 242.

BENEFITS OF THE INVENTION

As described above, the present invention provides specific benefits as enumerated below.

First, the initialization process can be delayed (until a predetermined initialization delay time passes from when power turns on and the printer starts operating) by not performing a print head and other printing mechanism initialization process even if a reset request is received by the printer from a host device, and performing the initialization process after this predetermined initialization delay time passes.

Second, operating costs can be reduced by preventing an ink-consuming cleaning process from being consecutively performed multiple times, and preventing needless wear of mechanical parts of the printing mechanism.

Third, needless wear of mechanical parts of the printing mechanism can be prevented and operating costs can be reduced because it is not necessary to actually drive the stepping motor, gears, and other parts of the drive chain to move and position the print head multiple times.

Fourth, the time required for printer initialization can be shortened by completing in advance initialization processes that do not incur ink consumption and mechanical parts wear even if performed repeatedly.

Fifth, the time required for printer initialization can be shortened by completing in advance a process for adjusting the phase of the stepping motor, which does not incur ink consumption and mechanical parts wear.

Sixth, the above-noted first predetermined time, that is, the predetermined initialization delay time, can be stored in a nonvolatile memory in the printer and changed dynamically according to the operating environment.

Seventh, the above-noted first predetermined time, that is, the predetermined initialization delay time, can be set from the host device.

Eighth, the printer can automatically learn an appropriate initialization delay time through actual operation of the printer in conjunction with the host device.

Ninth, a computer-readable data storage medium storing a program for controlling a printer can be easily distributed and marketed as a software product separately from the printer. In addition, a printing apparatus and initialization method therefore according to the present invention, as well as the above described benefits of the present invention, can be achieved by running the program stored on a data storage medium according to the present invention on a printer.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A printing apparatus for printing on a printing medium using a print head according to data received from a host device, comprising:
   a power on initialization controller for initializing the printing apparatus when printing apparatus power is turned on; and
   a first timer for measuring a first predetermined time after the printing apparatus starts operating;
   wherein the power on initialization controller is responsive to the first timer for performing a first initialization process before the first timer finishes measuring the first predetermined time, and
   wherein the power on initialization controller is responsive to the first timer for performing a second initialization process differing from the first initialization process after the first timer finishes measuring the first predetermined time; and
   a reset initialization controller for initializing the printing apparatus according to a reset request from the host device;
   wherein the reset initialization controller is responsive to the first timer for performing a third initialization process in response to a reset request before the first timer finishes measuring the first predetermined time, and
   wherein the reset initialization controller is responsive to the first timer for performing a fourth initialization process that is not the same as the third initialization process in response to a reset request after the first timer finishes measuring the first predetermined time.

2. The printing apparatus as set forth in claim 1, wherein the third initialization process is substantially the same as the first initialization process.

3. The printing apparatus as set forth in claim 1, wherein the third initialization process is included in the fourth initialization process.

4. The printing apparatus as set forth in claim 1, wherein the first initialization process and second initialization process are mutually exclusive, and
   a print head cleaning process is included in the second initialization process.

5. A printing apparatus for printing on a printing medium using a print head according to data received from a host device, comprising:
   a power on initialization controller for initializing the printing apparatus when printing apparatus power is turned on; and
   a first timer for measuring a first predetermined time after the printing apparatus starts operating:
   wherein the power on initialization controller is responsive to the first timer for performing a first initialization process before the first timer finishes measuring the first predetermined time, and
   wherein the power on initialization controller is responsive to the first timer for performing a second initialization process differing from the first initialization process after the first timer finishes measuring the first predetermined time; and
   a nonvolatile or battery backed-up memory for storing time data corresponding to the first predetermined time:
   a data changing circuit for updating the time data corresponding to the first predetermined time stored in the nonvolatile or battery backed-up memory;
   a reset detecting circuit for detecting a last startup reset request, which is a last reset request in a plurality of reset requests generated by the host device startup process; and
   a second timer for measuring a time elapsed from the start of printing apparatus operation to the last startup reset request detected by the reset detecting circuit;
   wherein the data changing circuit is responsive to the second timer for updating the time data based on the time measured by the second timer.

6. The printing apparatus as set forth in claim 5, further comprising a command detector for detecting a predetermined command in data received from the host device;
   wherein the data changing circuit updates the time data responsive to the predetermined command detected by the command detector.

7. The printing apparatus as set forth in claim 5, wherein:
   the second timer measures from the start of printing apparatus operation a second predetermined time that is longer than the first predetermined time, and wherein the reset detecting circuit detects as the last startup reset request the last reset request generated before the second timer finishes measuring the second predetermined time.

8. The printing apparatus as set forth in claim 5, wherein the data changing circuit adds a predetermined time to the time measured by the second timer to generate the time data, and stores the time data in nonvolatile or battery backed-up memory.

9. A printing apparatus for printing on a printing medium using a print head according to data received from a host device, comprising:

a power on initialization controller for initializing the printing apparatus when printing apparatus power is turned on; and a first timer for measuring a first predetermined time after the printing apparatus starts operating;

wherein the power on initialization controller is responsive to the first timer for performing a first initialization process before the first timer finishes measuring the first predetermined time, and wherein the power on initialization controller is responsive to the first timer for performing a second initialization process differing from the first initialization process after the first timer finishes measuring the first predetermined time; and a mode selector for selecting and setting one of a first mode and a second mode as an initialization mode of the power on initialization controller;

wherein the power on initialization controller performs in the first mode a first initialization process before the first timer finishes measuring the first predetermined time, and performs a second initialization process differing from the first initialization process after the first timer finishes measuring the first predetermined time; and in the second mode performs the first initialization process and second initialization process before the first timer finishes measuring the first predetermined time.

10. A method for initializing a printing apparatus for printing on a printing medium using a print head according to data received from a host device, comprising:

(a) initializing the printing apparatus when printing apparatus power is turned on; and (b) measuring a first predetermined time after the printing apparatus starts operating;

wherein the initialization step (a) comprises (c) performing a first initialization process before the first predetermined time measured in step (b) has expired, and (d) performing a second initialization process differing from the first initialization process after the first predetermined time as measured in step (b) has expired; and (e) initializing the printing apparatus according to a reset request from the host device;

wherein initialization step (e) comprises (f) performing a third initialization process in response to a reset request before the first predetermined time measured in step (b) has expired, and (g) performing in response to a reset request a fourth initialization process that is not the same as the third initialization process after the first predetermined time measured in step (b) has expired.

11. The initialization method as set forth in claim 10, wherein the third initialization process is substantially the same as the first initialization process.

12. The initialization method as set forth in claim 10, wherein the third initialization process is included in the fourth initialization process.

13. The initialization method as set forth in claim 10, wherein the first initialization process and second initialization process are mutually exclusive, and a print head cleaning process is included in the second initialization process.

14. A method for initializing a printing apparatus for printing on a printing medium using a print head according to data received from a host device, comprising:

(a) initializing the printing apparatus when Printing apparatus power is turned on; and (b) measuring a first predetermined time after the printing apparatus starts operating;

wherein the initialization step (a) comprises (c) performing a first initialization process before the first predetermined time measured in step (b) has expired, and (d) performing a second initialization process differing from the first initialization process after the first predetermined time as measured in step (1) has expired; and (h) storing time data corresponding to the first predetermined time in nonvolatile or battery backed-up storage; and (i) updating the time data corresponding to the first predetermined time stored in step (h); and (k) detecting a last startup reset request, which is a last reset request in a plurality of reset requests generated by a host device startup process; and (l) measuring a time elapsed from the start of printing apparatus operation to the last startup reset request as detected by the last startup reset request detecting step (k);

wherein step (i) updates the time data based on the time measured in step (l).

15. The initialization method as set forth in claim 14, further comprising:

(j) detecting a predetermined command in data received from the host device;

wherein step (i) updates the time data according to the predetermined command detected in command detecting step (j).

16. The initialization method as set forth in claim 14, wherein step (k) comprises:

(m) measuring from the start of printing apparatus operation a second predetermined time that is longer than the first predetermined time, and wherein the last reset request generated before the second predetermined time measured in step (m) has expired is detected as the last startup reset request.

17. The initialization method as set forth in claim 14, wherein step (i) comprises:

(n) generating the time data by adding a predetermined time to the time measured in step (1).

18. A method for initializing a printing apparatus for printing on a printing medium using a print head according to data received from a host device, comprising:

(a) initializing the printing apparatus when printing apparatus power is turned on; and (b) measuring a first predetermined time after the printing apparatus starts operating;

wherein the initialization step (a) comprises
(c) performing a first initialization process before the first predetermined time measured in step (b) has expired, and
(d) performing a second initialization process differing from the first initialization process after the first predetermined time as measured in step (b) has expired; and
(o) selecting and setting one of a first mode and a second mode as the initialization mode of step (a), wherein:
step (a) further comprises
(p) performing the first initialization process and second initialization process before the first predetermined time measured in step (b) has expired, and performing in the first mode steps (c) and (d), and performing in the second mode step (p).

19. A computer-readable data storage medium for storing a program of instructions executable by a computer to perform a method of initializing a printing apparatus that prints on a printing medium according to data received from a host device, the initialization method comprising:
(a) initializing the printing apparatus when printing apparatus power is turned on; and
(b) measuring a first predetermined time after the printing apparatus starts operating;
wherein the initialization step (a) comprises
(c) performing a first initialization process before the first predetermined time measured in step (b) has expired, and
(d) performing a second initialization process differing from the first initialization process after the first predetermined time as measured in step (b) has expired; and
(e) initializing the printing apparatus according to a reset request from the host device;
wherein initialization step (e) comprises
(f) performing a third initialization process in response to a reset request before the first predetermined time measured in step (b) has expired, and
(g) performing in response to a reset request a fourth initialization process that is not the same as the third initialization process after the first predetermined time measured in step (b) has expired.

20. A computer-readable data storage medium for storing a program of instructions executable by a computer to perform a method of initializing a printing apparatus that prints on a printing medium according to data received from a host device, the initialization method comprising:
(a) initializing the printing apparatus when printing apparatus power is turned on; and
(b) measuring a first predetermined time after the printing apparatus starts operating;
wherein the initialization step (a) comprises
(c) performing a first initialization process before the first predetermined time measured in step (b) has expired, and
(d) performing a second initialization process differing from the first initialization process after the first predetermined time as measured in step (b) has expired; and
(h) storing time data corresponding to the first predetermined time in nonvolatile or battery backed-up storage; and
(i) updating the time data corresponding to the first predetermined time stored statically in step (h).

21. The data storage medium as set forth in claim 20, wherein the initialization method further comprises:
(j) detecting a predetermined command in data received from the host device;
wherein step (i) updates the time data according to the predetermined command detected in command detecting step (j).

22. The data storage medium as set forth in claim 20, wherein the initialization method further comprises:
(k) detecting a last startup reset request, which is a last reset request in a plurality of reset requests generated by the host device startup process; and
(l) measuring a time elapsed from the start of printing apparatus operation to the last startup reset request as detected by the last startup reset request detecting step (k);
wherein step (i) updates the time data based on the time measured in step (l).

23. The data storage medium as set forth in claim 22, wherein step (k) of the initialization method comprises:
(m) measuring from the start of printing apparatus operation a second predetermined time that is longer than the first predetermined time,
where the last reset request generated before the second predetermined time measured in step (m) has expired is detected as the last startup reset request.

24. The data storage medium as set forth in claim 22, wherein step (i) of the initialization method comprises:
(n) generating the time data by adding a predetermined time to the time measured in step (l).

25. A computer-readable data storage medium for storing a program of instructions executable by a computer to perform a method of initializing a printing apparatus that prints on a printing medium according to data received from a host device, the initialization method comprising:
(a) initializing the printing apparatus when printing apparatus power is turned on; and
(b) measuring a first predetermined time after the printing apparatus starts operating;
wherein the initialization step (a) comprises
(c) performing a first initialization process before the first predetermined time measured in step (b) has expired, and
(d) performing a second initialization process differing from the first initialization process after the first predetermined time as measured in step (b) has expired; and
(o) selecting and setting one of a first mode and a second mode as the initialization mode of step (a), wherein:
step (a) further comprises
(p) performing the first initialization process and second initialization process before the first predetermined time measured in step (b) has expired, and performing in the first mode steps (c) and (d), and performing in the second mode step (p).

26. A computer program embodied on a carrier wave for implementing a method of initializing a printing apparatus that prints on a printing medium according to data received from a host device, the initialization method comprising:
(a) initializing the printing apparatus when printing apparatus power is turned on; and
(b) measuring a first predetermined time after the printing apparatus starts operating;

wherein the initialization step (a) comprises
- (c) performing a first initialization process before the first predetermined time measured in step (b) has expired, and
- (d) performing a second initialization process differing from the first initialization process after the first predetermined time as measured in step (b) has expired; and (e) initializing the printing apparatus according to a reset request from the host device;

wherein initialization step (e) comprises
- (f) performing a third initialization process in response to a reset request before the first predetermined time measured in step (b) has expired, and
- (g) performing in response to a reset request a fourth initialization process that is not the same as the third initialization process after the first predetermined time measured in step (b) has expired.

27. A computer program as set forth in claim 26, wherein the initialization method further comprises:
- (h) storing time data corresponding to the first predetermined time in nonvolatile or battery backed-up storage; and
- (i) updating the time data corresponding to the first predetermined time stored statically in step (h).

\* \* \* \* \*

UNITED STATES PATENT AND TRADEMARK OFFICE
CERTIFICATE OF CORRECTION

PATENT NO. : 6,693,717 B1
DATED : February 17, 2004
INVENTOR(S) : Mitsuaki Teradaira et al.

It is certified that error appears in the above-identified patent and that said Letters Patent is hereby corrected as shown below:

<u>Column 18,</u>
Line 24, please change "(1)" to -- (b) --.

Signed and Sealed this

Eighteenth Day of May, 2004

JON W. DUDAS
*Acting Director of the United States Patent and Trademark Office*